United States Patent
Siklósi et al.

(12) 
(10) Patent No.: US 6,451,282 B1
(45) Date of Patent: Sep. 17, 2002

(54) PROCESS FOR PRODUCTION OF ZEOLITES FROM RAW MATERIALS CONTAINING ALKALI ALUMINO HYDRO-SILICATES

(76) Inventors: Péter Siklósi, 5 Semmelweis u., Budapest, H-1052 (HU); Pál Fejes, 8, Kelemen u., Szeged, H-6720 (HU); Imre Kiricsi, 18/b Hobiart basa u., Szeged, H-6720 (HU); György Bánvölgyi, 8 Szekely M. u., Budapest, H-1061 (HU)

(*) Notice: Subject to any disclaimer, the term of this patent is extended or adjusted under 35 U.S.C. 154(b) by 0 days.

(21) Appl. No.: 09/530,462

(22) PCT Filed: Oct. 28, 1998

(86) PCT No.: PCT/HU98/00094
§ 371 (c)(1),
(2), (4) Date: Apr. 27, 2000

(87) PCT Pub. No.: WO99/21797
PCT Pub. Date: May 6, 1999

(30) Foreign Application Priority Data

Oct. 28, 1997 (HU) .............................................. 9701747

(51) Int. Cl.⁷ ........................ C01B 39/22; C01B 39/24; C01B 39/18
(52) U.S. Cl. ...................... 423/712; 423/709; 423/710; 423/DIG. 21; 423/DIG. 24
(58) Field of Search ................................ 423/709, 710, 423/712, DIG. 21, DIG. 24

(56) References Cited

U.S. PATENT DOCUMENTS 3,341,284 A * 9/1967 Young
4,102,977 A * 7/1978 Sugahara et al.
5,401,487 A * 3/1995 Puerto et al. ............... 423/712
5,948,383 A * 9/1999 Kuznicki et al. ........... 423/700

FOREIGN PATENT DOCUMENTS

| | | | |
|---|---|---|---|
| CA | 806 587 A | * | 2/1969 |
| CA | 1004655 | | 2/1977 |
| DE | 1 667 543 | | 4/1972 |
| EP | 451 112 A | * | 10/1991 |
| JP | 820002058 | | 1/1982 |
| JP | 63286526 | | 11/1988 |
| JP | 03-252309 A | * | 11/1991 |
| WO | WO 91/15427 | | 10/1991 |

OTHER PUBLICATIONS

Zeolite Production from DSP in Red Mud Feedstock Light Metals 1993.
Waste Materials Utilization of Red Mud from Bayer Process . . . by Kasai et al., Proc. of Int' Conf. on Processing, Nov. 7–10, 1993.

* cited by examiner

*Primary Examiner*—David Sample
(74) *Attorney, Agent, or Firm*—Herbert Dubno; Jonathan Myers

(57) ABSTRACT

The invention relates to a process for production of zeolites from raw materials with alkali alumino-hydrosilicate content comprising converting the alkali alumino-hydrosilicate content of the raw material into an amorphous state by acidic treatment, separating the intermediate amorphous solid material from the liquid phase and optionally purifying same, re-suspending it in water, alkalizing the suspension, followed by forming a slurry of the composition corresponding to the type of zeolite to be manufactured optionally by blending it with components containing $SiO_2$, and/or $Al_2O_3$ and/or $Na_2O$, followed by crystallization by method known per se after optionally adding crystal nuclei and/or aging of the synthesis slurry and separating the obtained zeolite product.

13 Claims, No Drawings

PROCESS FOR PRODUCTION OF ZEOLITES FROM RAW MATERIALS CONTAINING ALKALI ALUMINO HYDRO-SILICATES

TECHNICAL FIELD

The invention relates to a process for production of zeolites from raw materials containing alkali alumino-hydrosilicates.

BACKGROUND ART

The processes which are based on processing materials containing alkali alumino-hydrosilicates, first of all by-products of various industries are more and more important from the economical point of view. A process is known e.g. for manufacturing 4A zeolite from "red mud" obtained from the Bayer process which is widely used for making alumina from bauxites [Cardile C. M.: Removal and conversion of DSP in Red Mud to type 4A Zeolite (Int. Bauxite Tailing Workshop, 1992)]. The core of the process is the separation of particles smaller than 45 μm consisting mostly of alkali alumino-hydrosilicate with cyclones from particles greater than 45 μm, which consist mostly of $Fe_2O_3$. The alkalinity of the <45 μm fraction is reduced by washing with water, subsequently the slurry is acidified to pH=6.2 using $H_2SO_4$ and the Ca- and Mg-salts are removed by filtration or decantation. The filtrate is further acidified to pH=2.3 in order to bring the silicate components into a relatively stable colloid-like solution. The alumina containing silica solution obtained in this way is separated from the residues of red mud and is subsequently treated with the necessary amount of NaOH. Subsequently NaA zeolite is crystallized. The NaA (LTA) product is washed to remove the mother liquor (to below a value of pH 10.5) and dried. The filtrate mother liquor contains alkali sulfates in fairly high concentrations, from which the alkali content can partly be recovered by treatment with slaked lime (causticisation) and subsequently utilised in the Bayer process. In case of causticisation with slaked lime the alkali recovery yield is low, in fact, it is less than 50%. The recovered alkali solution contains non-reacted lime particles (and some calcium sulfate), consequently, the utilization of the solution obtained from the causticisation has little relevance in the alumina manufacturing process. One great disadvantage of the process described here is that a significant amount of sulfuric acid is required to acidify the raw material to a solution of pH 2.3 and a substantial amount of sodium hydroxide is needed for neutralization and converting the slurry alkaline with a pH of greater than 13.5 that is needed for the crystallization. A further disadvantage is that the iron oxide content of the red mud at least partly dissolves at pH 2.3 and thereby the zeolite product becomes contaminated. Therefore the commercial application of this process is not profitable and the purity of the product does not reach the European Standards.

The WO 91/15427 A1 patent application document laid available for the public describes a process in which sodalite or cancrinite originating from the Bayer alumina manufacturing process is used as it is or together with red mud; the sodium alumino-hydrosilicates content is dissolved with diluted sulfuric acid, subsequently a precursor gel is made from the resulting solution by blending it with a sodium hydroxide or sodium aluminate solution at a pH greater than 12, usually at a pH of 13.5. The precursor gel is aged at a temperature of 70–95° C. and subsequently NaA zeolite is obtained by crystallization. This process is basically identical with the process described above and the disadvantages are similar as well. It is to be emphasized that the viscosity temporarily increases to a great extent when the pH of the acidic solution is gradually increased. In order to avoid this kind of difficulty with mixing, it was proposed that all the amount of alkali which is needed to form the precursor be added within a very short time period. Inverse blending was also proposed (i.e. the acidic sodalite solution is to be added to the sodium hydroxide or sodium aluminate solution so that the difficulties with mixing are eliminated).

There is a need to develop such a process by which zeolite(s) can be made from raw materials containing alkali alumino-hydrosilicate in which the acid and alkali consumption are moderate, the zeolite product(s) has/have such a purity which meet(s) the expectations of the users in the world market, and the synthesis of zeolite can be carried out in common industrial equipment.

DISCLOSURE OF INVENTION

In our investigations it was found that a precursor slurry that is suitable for the crystallization of zeolite can be directly formed from alkali alumino-hydrosilicates provided that the alkali alumino-hydrosilicates are transformed to an amorphous state by an appropriate acid treatment. In this case the crystalline structure of the alkali alumino-hydrosilicates is destroyed by the removal of the charge compensating (mainly $Na^+$) cations. In order to reach this goal considerably less (sulfuric) acid is needed than for completely dissolving the alkali alumino-hydrosilicate. Furthermore, the process steps of dissolving the raw material in the acid and of making a strongly alkaline solution again from the highly acidic solution can be avoided. The gel formation, which is a difficult step of the previous processes can also be avoided since as per our invention, the precursor slurry, suitable for crystallization of zeolite can be obtained by blending the amorphous alkali alumino-hydrosilicates with silica, alkali and alumina in appropriate amounts. The amorphous solid zeolite precursor can be washed free of the excess acid. or even dried. After addition of (considerably less) sodium hydroxide (and other components) the slurry obtained (possibly after aging) is ready to be crystallized into various commodity zeolite products (like NaA, NaX, NaY or maximum aluminium P zeolite).

On the basis of this understanding, this invention provides an improved process for the transformation of alkali (preferably sodium) alumino-hydrosilicates into various zeolites by acid treatment to destroy their crystalline structure first, (an amorphous material is made in this way), followed possibly by purification, and a subsequent separation of the intermediate amorphous solid from the liquid phase; then the slurry for zeolite crystallization is prepared from this amorphous material by suspending it in water which possibly contains alkali (sodium hydroxide) and possibly after addition of alumina-, and/or silica- and/or $Na_2O$-containg components and/or crystallization promoters thereby adjusting the proper zeolite slurry composition. The zeolite slurry is possibly aged and/or blended with zeolite nuclei. After these the crystallization, filtration and/or washing and drying are carried out according to the known processes.

According to the present invention, natural alkali alumino-hydrosilicates and/or industrial by-products or wastes containing mainly alkali alumino-hydrosilicates can be used as raw materials. Materials with at least 50 w % (on dry basis) alkali alumino-hydrosilicates in the form of crystalline or amorphous compounds are considered as raw materials. Further on materials with alkali alumino-hydrosilicate content as defined here are considered as raw materials.

Acceptable raw materials are the desilication products which are obtained in the first step of the desilication of the pregnant liquor that is carried out at 150–170° C. in the sintering alumina manufacturing process. Natural materials which contain alkali alumino-hydrosilicates such as nepheline with a low iron content can be used as raw material, too.

It is to be mentioned that "sodium alumino-hydrosilicate" materials of high purity can preferably be obtained from the Bayer alumina manufacturing process by an Improved Low Temperature Digestion Process (Gy. Bánvölgyi: Travaux Vol. 24, 1997 (No 28) ICSOBA, Budapest, Proc. of 8th International Congress, Apr. 16–18, 1997, Milan, Italy, pp 214–2281 or in combined Bayer/sintering processes.

The raw materials, which can be used in the embodiment of this invention, are desilication products of sodium alumino-hydrosilicate type originating from various alumina manufacturing processes or scales deposited therein, as they are available, cheap and materials otherwise difficult to utilize.

The various alkali alumino-hydrosilicate by-products of the alumina manufacturing processes can be described with the following general formula

$3[Na_2O.Al_2O_3.2SiO_2.(2+k)H_2O].Na_2X$ where $0 \leq k \leq 2$, and X means $2OH^-$, $CO_3^{2-}$, $SO_4^{2-}$, $2Cl$, or $2Al(OH)_4^-$. If crystalline, their crystal structure is either that of sodalite (Bayer sodalite), nosean, or cancrinite (the latter is formed during the high temperature digestion of bauxites, or in scalings that are formed in low temperature digestion autoclaves during very long time periods).

The embodiment of the process described in this invention is not restricted to those raw materials mentioned previously as examples, neither in their chemical composition, nor in their crystalline structure.

As mentioned previously, the basic idea of the present invention is that the alkali alumino-hydrosilicate raw material is not dissolved in the acid, it is only transformed to the amorphous state by exchanging the charge compensating alkali (mainly $Na^+$) ions for $H^+/H_3O^+$ ions. This causes a very rapid collapse of the crystal structure even at room temperature. For this, a little more acid (10–30% in excess) is needed than that required only to neutralize the overall alkalinity of the raw material, nevertheless, this amount of acid is still less than half of the one that is to be used for the complete dissolution of the alkali alumino-hydrosilicates at $pH \equiv 2.3$. From the chemical character of the treatment it is obvious, that the concentration of the acid is irrelevant, the ion exchange takes place even in weak acid solutions. The structural aluminium is left intact, therefore the exact amount (and concentration) of the acid should be determined experimentally. The collapse of the crystal structure can easily be tested by X-ray diffractometry, The material is amorphous if the acid-treated, filtered and washed sample after its drying and treatment at ~600° C. for 1–2 h, the X-ray pattern that is characteristic to the alkali alumino-hydrosilicate of the raw material substantially disappears and the X-ray pattern is characteristic of the amorphous material.

The acid that is used for the treatment can be any mineral or organic acid, a mixture of various acids, it can be an acidic waste from the industry, such as from alumina refineries, which may contain solid and/or dissolved silica-containing scalings from the acidic cleaning of the equipment. Preferred is a sulfuric acid solution of 3–60 w %.

In order to be sure that the crystal structure of the alkali alumino-hydrosilicate has collapsed, i.e. the material has become amorphous, the temperature of the acid treatment should be between 20 and 160° C., preferably at 60–80° C.

The product of the acid treatment can be filtered off from the slightly acidic (pH≡4.5–5) solution without difficulty, and if necessary, the excess acid can be removed by washing and later on it can be neutralised with diluted alkali. If iron impurities are present, their complexation can be carried out preferably in the acidic solution. The washed (neutralised) zeolite precursor can be dried and stored if the further processing steps shall be carried out afterwards.

According to the present invention the next step of converting the precursor to zeolite product is the preparation of the synthesis slurry from the amorphous intermediate material/product. The composition of the synthesis slurry depends on the type of zeolite to be made. Water glass (sodium silicate) solution is preferably used as $SiO_2$ source. The water glass, which is commercially available usually, does not need to be purified. The same is relevant for the sodium hydroxide, irrespective of whether it is solid or in solution. The sodium hydroxide solution should not contain more than 10% of sodium carbonate. In alumina refineries spent liquor is mostly used as $Al_2O_3$ and $Na_2O$ source. The carbonate content of the spent liquor should not be more than 10% of the total alkali content otherwise the prescriptions should be modified (e.g. lower temperature is to be applied) in order to eliminate the "carbonate effect". Of course, other $SiO_2$, $Na_2O$ and $Al_2O_3$ sources can also be used in the zeolite synthesis, however their price is usually far too high to be competitive with spent liquors or wastes and/or by-products of the alumina refineries.

No gel-formation is to be applied in the invention disclosed here, therefore the sequence of admixing of the respective components is not important. On the other hand, very efficient (shear-)mixing should be used to reach maximum homogeneity of the slurry and it is most often a must to maintain vigorous mixing even during the synthesis, except for certain zeolite products where such vigorous mixing is prohibited, as in the synthesis of NaY.

In some cases crystallisation of the expected zeolite is possible only after appropriate ageing of the slurry, or addition of crystal nuclei. Types NaA and NaX or even $NaP_c$ (if the Si/Al ratio is greater than 3 and $K^+$ ions are present in the slurry) crystallise spontaneously, therefore, no crystal nuclei addition is necessary. On the contrary, NaY can only be produced if (NaX) nuclei are added to the slurry before crystallisation. NaX can be prepared in mixed slurries if crystallisation is preceded by 4–6 h ageing at about 40–60° C.

Crystallisation, as usual in the industries, is carried out in the 60–170° C. temperature range, depending on the type of zeolite. NaA(LTA) can be produced in excellent purity between 60–88° C., whereas making $NaP_c$(GIS) zeolite needs higher, prefeably 110–135° C. temperature. Mixing, preferably vigorous mixing is generally advantageous. Nevertheless when mixing influences the type of zeolite that forms, no mixing is recommended, or the necessary amount of nuclei should be added before the start of the crystallisation with mixing.

The time of crystallisation lasts from 0.5 h to several days, depending on the type of zeolite and the crystallisation temperature. Generally, the commercially important types with high specific surface area and open pore structure are all metastable from the physico-chemical (thermodynamical) point of view, therefore, extended heating may cause their transformation into stable type(s) which have compact structures and have no practical commercial use.

Filtration and washing until the pH of the filtrate decreases to 10.5 or less follows the crystallization. The filter cake is dried at 100–120° C.

The previously mentioned zeolite types, NaA (LTA). NaX (FAU), MAP-NaP$_c$(GIS) have found several application as detergent builders, desiccants, adsorbents, and carriers for perfumes, animal nutrients or catalysts.

The synthesis procedure described in the present invention allows the production of a wide variety of zeolites from natural raw materials, industrial by-products and wastes as well. The present invention can be used for processing of the desilication by-product (sodalite) of the pregnant liquor desilication of the alumina refineries.

The possibly negative environmental impact of the process according to the present invention is significantly less than that of the ones of the known processes mentioned in the introductory part. For example, when sodium alumino-hydrosilicate corresponding to the formula $$3[Na_2O.Al_2O_3.2SiO_2.(2+k)H_2O].Na_2X$$

where k=1 and X=2OH$^-$ is dissolved (with dissolution of the sodium alumino-hydrosilicate with sulfuric acid and proceeding with the dosage of the sulfuric acid until the pH reaches a value between 2 and 3) as indicated in the relevant patents WO 91115427 A1, a significant amount of Na$_2$SO$_4$ is generated which can hardly be disposed of in an environmentally sustainable manner. On the contrary, according to the present invention, less sulfuric acid is needed for the ion exchange, and thus less amount of sodium sulfate is generated. If the invention is implemented next to a Bayer alumina refinery, and the filtrate from the zeolite production that contains a certain amount of Na$_2$SO$_4$ is used in the Bayer process, at least a part of the caustic make-up can be provided by this filtrate, since the desilication product can be obtained at least partly as sulfate-sodalite (nosean, X=SO$_4^{2-}$) instead of hydroxi-sodalite. Thereby the sulfuric acid demand for neutralization of the desilication product can further be reduced and even less sodium sulfate is formed in the zeolite production.

The "theoretical" (stoichiometric) sulfuric acid demand for the respective processes is shown in Table 1 as it follows:

TABLE 1

| Raw materials and processes | H$_2$SO$_4$ demand, moles for 1 mole formula-weight | H$_2$SO$_4$ demand in kg-s for 1 t of raw material |
| --- | --- | --- |
| raw material: hydroxide sodalite process: WO 91/15427 A1 | 13 | 1165 |
| raw material: hydroxi-sodalite process: as per present invention | 4 | 358 |
| raw material: nosean process: as per present invention | 3 | 254 |

The composition of the raw material and the process parameters influence the acid consumption that is really needed to carry out both processes. The figures given in Table 1 are based on the theoretical assumption that during the acid treatment according to the present invention only the charge compensating Na$^+$ ions should be replaced, while in the process of WO 91/15427 A1 both the Na- and the Al-contents of the alkali alumino-hydrosilicate have to be dissolved by the acid.

As far as it is shown in Table 1, as per the present invention, significantly less acid is demanded for the acid treatment, compared with the WO 91/15427 A1 process. It should also be taken into consideration that in the WO 91/15427 A1 process the pH has to be reduced to a value between 2 and 3 which further increases the acid consumption. In case of our process disclosed here a pH which is only somewhat lower than the neutral is characteristic. It is also to be mentioned that the neutralization of the acidic solution with a pH between 2 and 3 needs some further amount of caustic, therefore more sodium sulfate is formed which increases the environmental concerns due to the disposal of the latter.

Tables 2 and 3 show further comparisons between the process as per the present invention and the process disclosed in WO 91115427 A1. The "theoretical" sodium hydroxide consumption is shown in Table 2 and the "theoretical" sodium sulfate production in Table 3. (The data indicated in these tables are calculated on the same theoretical assumptions that has already been discussed in connection with Table 1.)

TABLE 2

| Raw materials and processes | NaOH demand, moles for 1 mole formula-weight | NaOH demand in kg-s for 1 t of raw material |
| --- | --- | --- |
| raw material: hydroxide sodalite process: WO 91/15427 A1 | 26 | 951 |
| raw material: hydroxi-sodalite process: as per present invention | 8 | 292 |
| raw material: nosean process: as per present invention | 8 | 277 |

TABLE 3

| Raw materials and processes | Na$_2$SO$_4$ production, moles for 1 mole formulaweight | Na$_2$SO$_4$ production in kg-s for 1 t of raw material |
| --- | --- | --- |
| raw material: hydroxide sodalite process: WO 91/15427 A1 | 13 | 1687 |
| raw material: hydroxi-sodalite process: as per present invention | 4 | 519 |
| raw material: nosean process: as per present invention | 3 | 491 |

As it is shown in Table 2 a substantial saving can be attained in the NaOH consumption, if the process according to the present invention is used. It is demonstrated in Table 3 that significantly less Na$_2$SO$_4$ is produced with the present invention than with the known process.

Consequently, the process according to the present invention is superior to the previously known processes as far as the basic reagent consumptions and also the environmental disadvantages are concerned.

If the process according to the present invention is implemented in connection with an alumina refinery, the mother liquor of the zeolite synthesis that contains mainly NaOH and some sodium aluminate and some sodium sulfate can be fully utilized in the Bayer process as make-up caustic. Furthermore, the Na$_2$SO$_4$ (which is obtained when the alkali alumino-hydrosilicate raw material is converted into an amorphous material) can be used in the alumina manufacturing process at least in part.

The process according to the present invention can also be used for processing hydroxide sodalite (or analcime) which can be formed if some trouble occurs with the zeolite synthesis process that is widely used for the time being.

The process according to the present invention is demonstrated by examples, however these examples shall not restrict the scope of the invention. Laboratory circumstances are shown in the following examples. The operations in the examples can be implemented in a commercial scale, in common industrial equipment after their scaling up which is a common task of a professional who has experience in the relevant field.

EXAMPLE 1

Making NaA zeolite from hydroxi-sodalite 100 g hydroxi-sodalite, with the composition of $1.3Na_2O.Al_2O_3.2SiO_2.3H_2O$ is blended with 854.0 g of 5% $H_2SO_4$ solution (this is a 10% excess relative to the amount of $H_2SO_4$ that is stoichiometrically required to neutralize the alkali content) and the blend is mixed for 3 hours at 60° C. After this, the liquid phase, which contains sodium sulfate (and possibly Fe(III) sulfate in traces), is separated by filtration, the solid phase is washed once with distilled water and dried at 110° C.

A 3 g sample of the acid-treated hydroxi-sodalite is kept in a Pt crucible for 3 hours at 500° C. and it is checked if the material is fully amorphous. If the X-ray diffraction pattern of the material is not fully amorphous yet, the acid treatment of the hydroxi-sodalite will be repeated with 915 g of 5% $H_2SO_4$ solution as per the procedure that has been described above and the crystal structure of the product of the acid treatment is checked again.

10.0 g of the dried amorphous intermediate product is subsequently wetted with 6.0 g of distilled water, 1 N NaOH solution is added to the blend until it gets slightly alkaline. Phenolphthalein indicator is used for this. The water content of the NaOH solution (X g) is registered and later on it is to be deducted from the total amount of the water to be added when the synthesis slurry is composed.

8.5 g NaOH is dissolved in (40.2-X) g distilled water, the resulting solution is blended with 2.2 g concentrated sodium aluminate. (100 g concentrated sodium aluminate contains 0.194 moles of $Al_2O_3$, 0.309 moles of $Na_2O$ and 3.394 moles of water.) The resulting solution is added to the amorphous material obtained from the acid treatment, 0.5 g of NaA nuclei (which has already been blended with some drops of water and ground in a mortar) is added to the slurry. The resulting synthesis slurry is properly homogenised by mixing and subsequently it is placed into a teflon-lined autoclave which can be rotated around a horizontal shaft. The autoclave has a volume of 180 ml. Some 34 teflon balls are placed into the autoclave. The autoclave is sealed and the slurry is aged for 1 hour at 40° C. by rotating the autoclave at 60 rpm (rotation per minute). This equipment provides a mixing by rocking agitation. The temperature is subsequently increased to 88° C. and the crystallization takes place in 1.5 hours, meanwhile the mixing is continued.

The autoclave is subsequently cooled, the teflon balls are removed and the resulting slurry is poured into 200 ml of distilled water, subsequently filtered and the solids are washed with hot distilled water until the wash-filtrate's pH decreases to a value of 10. The product is dried at a temperature of 110° C. 13.4 g zeolite product of excellent quality is obtained in this way. The product contains 96% of NaA(LTA) zeolite. The main contaminant is less than 4% hydroxi-sodalite.

EXAMPLE 2

Making NaA zeolite from desilication product of an alumina refinery

The raw material is desilication product with the formula of $1.01Na_2O.Al_2O_3.1.73SiO_2.0.21SO_3.1.24H_2O$ originating from an alumina refinery where the soda-limestone sintering process was used. 100 g of the raw material is blended with 427 g of 10% $H_2SO_4$ solution and is treated with the acid solution as per Example 1. The treatment lasts for 3 hours at 60° C. and subsequently the resulting slurry is filtered, the solid phase is washed once with distilled water and dried at 110° C.

10 g of the dried amorphous intermediate product is subsequently wetted with 10 g of distilled water, and 1 N NaOH solution is added to the blend until it gets slightly alkaline. Phenolphthalein indicator is used for this. The water content of the NaOH solution (X g) is registered.

8.5 g NaOH is dissolved in (36.0-X) g distilled water; the resulting solution is blended with the slurry containing the amorphous intermediate product. The resulting slurry is homogenised with mixing and subsequently it is placed into a teflon-lined autoclave that can be rotated around a horizontal shaft. Some 3–4 teflon balls are placed into the autoclave, the autoclave is sealed and the slurry is aged for 3 hours at 40° C. by rotating the pot at 60 rpm. The temperature is subsequently increased to 88° C. and the crystallization takes place in 1.5 hours, meanwhile the mixing is continued.

After such crystallization, the product is obtained as per the Example 1. The amount of the product is 10.3 g well-crystallized NaA(LTA) zeolite as per its X-ray diffractometry pattern, with the presence of less than 2% of a hydroxi-sodalite contaminant.

EXAMPLE 3

Making $NaP_c$ zeolite from hydroxi-sodalite 100.0 g hydroxi-sodalite is treated with 5% $H_2SO_4$ solution as per Example 1. 30.0 g of the dried amorphous intermediate product is subsequently wetted with 17.0 g of distilled water, and 1 N NaOH solution is added to the blend until it gets slightly alkaline. Phenolphthalein indicator is used for this. The water content of the NaOH solution (X g) is registered.

7.5 g water glass of commercial grade is dissolved in (86.0-X) g distilled water. 100 g of water glass contains 0.443 moles of $SiO_2$, 0.192 moles of $Na_2O$ and 3.633 moles of water. 17.4 g of solid NaOH is added to the water glass solution. The resulting solution is blended with the suspension of the amorphous intermediate product. 3.0 g of $NaP_c$ nuclei are mixed with some drops of water, ground in a mortar and added to the slurry. The resulting slurry is homogenised with a shaking machine for 1.5 hours; subsequently it is placed into a teflon-lined autoclave. Some 3–4 teflon balls are placed into the autoclave. The autoclave is sealed, the temperature is subsequently increased to 110° C. and the crystallization takes place in 4 hours under continuous mixing.

The amount of the product is 40.0 g well crystallized $NaP_c$(GIS) zeolite as per its X-ray diffractometry pattern. The composition of the product corresponds to the formula $Na_2O.Al_2O_3.2.3SiO_2.2.5–3H_2O$. Maximum 5% of hydroxi-sodalite is in the product as contaminant.

EXAMPLE 4

Making $NaP_c$ nuclei 13.5 g solid NaOH is dissolved in 393 of distilled water. The resulting solution is split into 2 parts so that one part is blended with 105.4 g of commercial grade water glass and the other part is blended with 51.5 g of concentrated sodium aluminate. The resulting solutions should be of nearly equal volume. 100 g of water glass contains 0.443 moles of $SiO_2$, 0.192 moles of $Na_2O$ and 3.633 moles of water. 100 g of concentrated sodium aluminate contains 0.194 moles of $Al_2O_3$, 0.309 moles of $Na_2O$ and 3.394 moles of water.

The solutions are cooled to +4° C. in a refrigerator, and the sodium aluminate solution is added to the sodium silicate solution within 2 minutes, meanwhile the latter is vigorously agitated. 17.4 g solid potassium perchlorate is added to the gel obtained by this way, and the mixing is continued for 0.5 hours so that the salt is dissolved.

The slurry is crystallized for 5 hours at 100° C. and an rpm of 100/min. Rotating type mixing is applied in a teflon-lined autoclave that can be rotated around a horizontal shaft. Some 3–4 teflon balls are placed into the crystallizer autoclave. The temperature is subsequently increased to 110° C. and the slurry is crystallized for 1.5 hours meanwhile the mixing is continued.

The product is well-crystallized $NaP_c$ zeolite nuclei suspension as per its X-ray diffractometry pattern. The size of the crystals is less than 1 µm. This solid phase is difficult to filter; however, it can be used for the crystallization of a low Si/Al module $NaP_c$ zeolite without grinding.

EXAMPLE 5

Making $NaP_c$ zeolite from desilication product of an alumina refinery

The raw material is desilication product (DSP) from an alumina refinery where bauxite is processed by the sintering method. The composition of the desilication product is the same as in Example 2. 100 g of DSP is treated with 5% sulfuric acid solution as described in Example 1. The slightly acidic amorphous intermediate product is filtered off, subsequently washed once with distilled water and subsequently dried at 110° C. 10 g of dried amorphous intermediate product is subsequently wetted with 10 g of distilled water, and 1 N NaOH solution is added to the blend until it gets slightly alkaline. Phenolphthalein is used for the indication of the alkalinity. The water content of the NaOH solution (X g) is registered.

6.0 g solid NaOH is dissolved in (83.0-X) g distilled water. The resulting solution is blended with 2.0 g water glass of commercial grade. 100 g of water glass contains 0.443 moles of $SiO_2$, 0.192 moles of $Na_2O$ and 3.633 moles of water. The solution obtained in this way is blended with the suspension that contains the amorphous intermediate product. 1 g of $NaP_c$ nuclei is also added to the slurry after its mixing with some drops of water.

The resulting slurry is homogenised in a shaking machine with the help of steel balls and subsequently it is placed into a teflon-lined autoclave. Some 3–4 teflon balls are placed into the crystallizer autoclave. The autoclave is sealed, the temperature is subsequently increased to 110° C. and the crystallization takes place for 4 hours under continuous mixing. The temperature is subsequently increased to 135° C. and the crystallization takes place for 2 hours under continuous mixing. The product is subsequently obtained as described in Example 1.

The amount of the product is 11.0 g well crystallized $NaP_c$(GIS) zeolite as per its X-ray diffractometry pattern.

The composition of the product corresponds to the formula $Na_2O.Al_2O_3.2.18SiO_2\ 2.5–3H_2O$. Less than 3% of hydroxisodalite is in the product as contaminant.

What is claimed is:

1. A process for preparing a crystalline zeolite product from an alkali aluminohydrosilicate raw material selected from the group consisting of a desilication product from an alumina manufacturing process and an alkali aluminohydrosilicate scaling from an alumina manufacturing process, which comprises the steps of:
    (a) providing the alkali aluminohydrosilicate raw material from an alumina plant;
    (b) acidifying the alkali aluminohydrosilicate raw material with an acid to convert the raw material into an intermediate amorphous solid material and a liquid phase;
    (c) separating the intermediate amorphous solid material from the liquid phase;
    (d) suspending the intermediate amorphous solid material in water to form a slurry for crystallization of zeolite;
    (e) crystallizing zeolite from the slurry formed in step (d) to obtain a crystalline zeolite product; and
    (f) separating the obtained crystalline zeolite product.

2. The process defined in claim 1 wherein according to step (b) the amount of the acid needed to convert the alkali aluminohydrosilicate raw material to an amorphous state is determined by evaluating an X-Ray diffraction pattern of a sample of the obtained intermediate amorphous solid material to determine if the alkali aluminohydrosilicate raw material has been fully converted to an amorphous state, and if the alkali aluminohydrosilicate raw material is not fully amorphous, repeating the acidification.

3. The process defined in claim 1 wherein according to step (b) an acidic waste from an alumina refinery is used for the acidification.

4. The process defined in claim 1 wherein according to step (b) a mineral acid is used for the acidification.

5. The process defined in claim 4 wherein according to step (b) sulfuric acid is the mineral acid used for the acidification.

6. The process defined in claim 5 wherein a sulfuric acid solution of 3 to 60 weight % is used for the acidic treatment.

7. The process defined in claim 1 wherein according to step (b) the acidification is carried out at 20 to 160° C.

8. The process defined in claim 1 wherein according to step (d) the water in which the intermediate amorphous solid material is suspended, contains an alkali.

9. The process defined in claim 1 wherein according to step (d) forming the slurry for the crystallization of zeolite further includes blending the suspension with a compound selected from the group consisting of $SiO_2$, $AlO_3$, and $Na_2O$ or mixtures thereof.

10. A process for preparing a crystalline zeolite product from a crystalline alkali aluminohydrosilicate raw material, which comprises the steps of:
    (a) providing the crystalline alkali aluminohydrosilicate raw material;
    (b) acidifying the alkali aluminohydrosilicate raw material with 3 to 60 weight % sulfuric acid effective to collapse the crystalline structure of the alkali aluminohydrosilicate raw material by removal of charge compensating cations therefrom which are replaced by hydrogen ions and to convert the raw material into an intermediate amorphous solid material and a liquid phase, without dissolving the alkali aluminohydrosilicate raw material in the sulfuric acid;

(c) separating the intermediate amorphous solid material from the liquid phase;

(d) suspending the intermediate amorphous solid material in water to form a slurry for crystallization of zeolite;

(e) crystallizing zeolite from the slurry suitable to form a crystalline zeolite product; and (f) separating the obtained crystalline zeolite product.

11. The process defined in claim 10 wherein according to step (a) the crystalline alkali aluminohydrosilicate raw material is selected from the group consisting of a desilication product from an alumina manufacturing process and an alkali alumino-hydrosilicate scaling from an alumina manufacturing process.

12. The process defined in claim 10 wherein according to step (d) the water in which the intermediate amorphous solid material is suspended, contains an alkali.

13. The process defined in claim 10 wherein according to step (d) forming the slurry for the crystallization of zeolite further includes blending the suspension with a compound selected from the group consisting of $SiO_2$, $Al_2O_3$, and $Na_2O$ or mixtures thereof.

* * * * *